United States Patent [19]

Arano et al.

[11] Patent Number: 5,145,613
[45] Date of Patent: Sep. 8, 1992

[54] PROCESS FOR PRODUCING A HEAT-RESISTANT ALUMINA FILBER MAT

[75] Inventors: Noriyuki Arano; Michiyo Tsuchiya, both of Oumimachi, Japan

[73] Assignee: Denki Kagaku Kogyo Kabushiki Kaisha, Tokyo, Japan

[21] Appl. No.: 643,522

[22] Filed: Jan. 18, 1991

Related U.S. Application Data

[60] Division of Ser. No. 463,010, Jan. 9, 1990, Pat. No. 5,047,289, which is a continuation of Ser. No. 137,427, Dec. 23, 1987, abandoned.

[51] Int. Cl.$^5$ .................. B29D 28/00; B29B 9/00; B32B 7/08
[52] U.S. Cl. .................................. 264/8; 156/89; 156/93; 264/60; 264/103
[58] Field of Search .............. 156/93, 89; 264/8, 60, 264/103, 210.8

[56] References Cited

U.S. PATENT DOCUMENTS 3,996,145 12/1976 Hepburn .................... 252/62
5,041,321 8/1991 Bendig ..................... 428/102

Primary Examiner—James Lowe
Assistant Examiner—Christopher A. Fiorilla
Attorney, Agent, or Firm—Darby & Darby

[57] ABSTRACT

A heat-resistant alumina fiber mat contains an accumulated mass of alumina staple fibers and continuous alumina filaments. The accumulated mass is sewn with the continuous alumina filaments. A process for producing a heat-resistant alumina fiber mat includes accumulating a precursor of alumina staple fibers to obtain an accumulated mass, sewing the accumulated mass with continuous filaments to give a sewn mass and then sintering the sewn mass. The continuous filaments may be continuous alumina filaments or a precursor thereof.

9 Claims, 1 Drawing Sheet

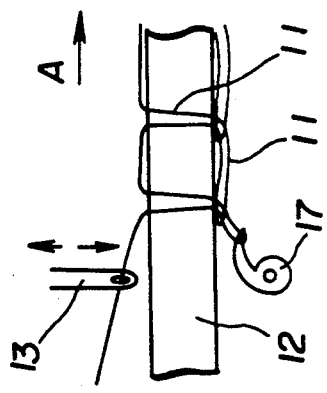
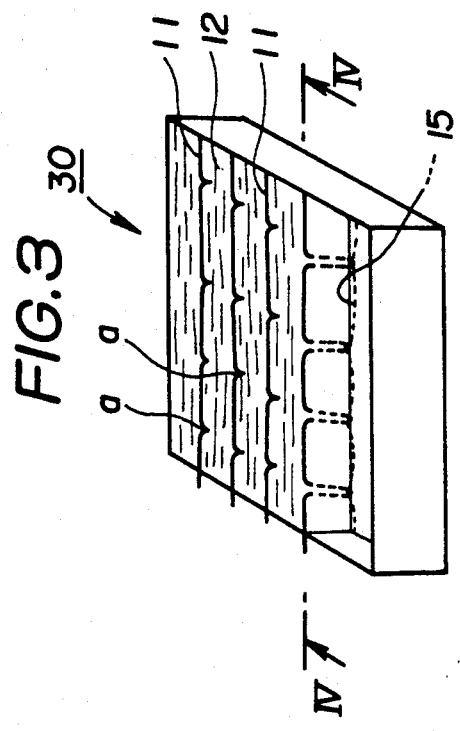
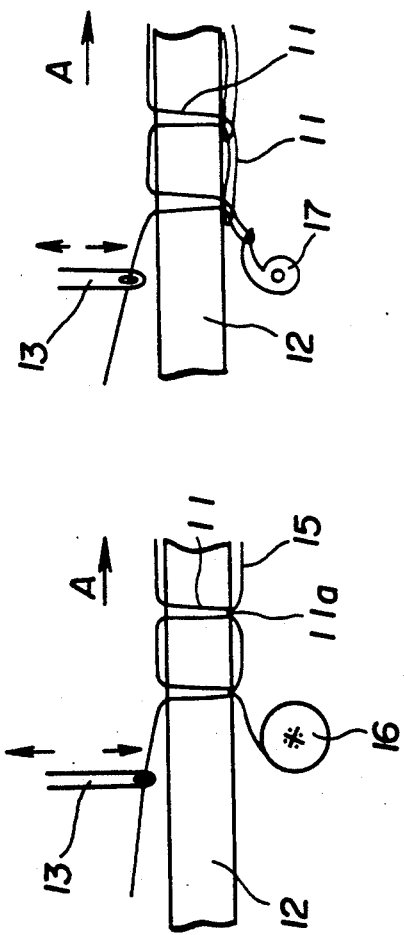

PROCESS FOR PRODUCING A HEAT-RESISTANT ALUMINA FILBER MAT

This is a division of application Ser. No. 07/463,010, filed Jan. 9, 1990, now U.S. Pat. No. 5,047,289, which in turn in a continuation of application Ser. No. 07/137,427, filed Dec. 23, 1987, now abandoned.

BACKGROUND OF THE INVENTION:

This invention relates to a heat-resistant alumina fiber mat and, more particularly, to a heat-resistant alumina fiber mat suitably employed as a fire-resistant and heat-insulating material provided on the inner sides of industrial heating furnaces, such as those used in iron and steel making, in the field of ceramics or in chemical plants. The present invention also relates to a process for producing such a heat-resistant alumina fiber mat.

At the present time, mats in the form of blankets formed of amorphous ceramic fibers containing 40 to 60 wt. % of $Al_2O_3$ and 60 to 40 wt. % of $SiO_2$ and blocks produced therefrom, are used extensively. Since the maximum temperature of these ceramic fiber mats to be used is 1200° C., crystalline alumina fibers containing 70 to 95 wt. % of $Al_2O_3$ and 5 to 30 wt. % of $SiO_2$ are recently evolved for application in industrial heating furnaces operated at still higher temperatures.

However, since the crystalline alumina fibers are lower in strength than the amorphous ceramic fibers, the fibers tend to be crushed to pieces when they are subjected to needle punching employed in ceramic fibers, so that it is difficult to produce the mats of higher strength. For this reason, the crystalline alumina fiber mats are produced by the wet process comprising fistly pulperizing the alumina fibers in water, followed by addition of a suitable binder and felting. However, since the fibers are cut by this method to lengths of several millimeters during the pulperizing operation, the fibers may be entangled only to a limited extent. Moreover, after an organic sizing agent has burnt off at higher temperatures, the tensile strength is lowered to 50 to 100 $g/cm^2$, while the peeling strength is also as low as 5 $g/cm^2$ at most. The term 'tensile strength' herein means the strength along the length or width of the mat formed of fibers, while the term 'peeling strength' means the strength along its thickness.

On the other hand, it has been attempted to use the fibers in the state of fiber lengths obtained directly after accumulation. For example, there is proposed in the Japanese Laid-open Patent Publication No.110439/1985 a process for producing an alumina fiber mat containing an organic non-woven fabric as the reinforcement by needle punching. However, this method is inconvenient in that the alumina fibers are crushed to pieces during needle punching, and in that the organic non-woven fabric is burnt off when the mat is used at elevated temperatures, while the peeling strength cannot be elevated because of decrease in the mat density.

There is further proposed in the Japanese Laid-open Patent Publication No. 252717/1985 a process for producing the mats in the form of blankets comprising needle punching an accumulated mass of a precursor of alumina fibers, that is, an intermediate product of alumina fibers obtained before sintering, and sintering the obtained precursor. With this process, it is presumably possible to produce mats with higher strength than that of those produced by the conventional processes. However, by this process, the peeling strength has an extremely low value of not more than 1 $g/cm^2$. Also, for producing the mats of higher tensile strength, the accumulated body of the precursor may be effectively humidified and pressurized for providing higher mat density without using expensive needle punching machines. However, in this case, only an extremely small value of the peeling strength has similarly been obtained.

As described hereinabove, it has been difficult with the prior art to produce a highly heat-resistant alumina fiber mat having high peeling strength in addition to high tensile strength at elevated temperatures proper to the highly heat-resistant crystalline alumina fibers.

SUMMARY OF THE INVENTION

It is a principal object of the present invention to provide a heat-resistant alumina fiber mat having both high tensile strength and high peeling strength, and a process for manufacture thereof.

It is another object of the present invention to provide a heat-resistant alumina fiber mat that may be produced at lower costs without destructing alumina fibers and without employing needle punching machines, and a process for manufacture thereof.

According to the present invention, there is provided a heat-resistant alumina fiber mat comprising an accumulated mass of alumina staple fibers and continuous alumina filaments, the accumulated mass being sewn with the continuous alumina filaments.

According to the present invention, there is also provided a process for producing a heat-resistant alumina fiber mat comprising accumulating a precursor of alumina staple fibers to obtain an accumulated mass, sewing the accumulated mass with continuous filaments selected from the group consisting of continuous alumina filaments and a precursor of continuous alumina filaments to give a sewn mass and then sintering the sewn mass.

BRIEF DESCRIPTION OF THE DRAWINGS

FIG. 1 is a perspective view showing a heat-resistant alumina fiber mat of the present invention and showing an example of its sewn state, with portions thereof being removed.

FIG. 2 is a diagrammatic sectional view taken along line II—II of FIG. 1.

FIG. 3 is a perspective view showing a heat-resistant alumina fiber mat of the present invention and showing another example of its sewn state, with portions thereof being removed.

FIG. 4 is a diagrammatic sectional view taken along line IV—IV of FIG. 3.

FIG. 5 is a diagrammatic sectional view similar to FIG. 4 but showing another method of sewing.

DETAILED DESCRIPTION OF THE PREFERRED EMBODIMENTS

The present invention will be explained further in detail.

A heat-resistant alumina fiber mat of the present invention is comprised of an accumulated mass of alumina staple fibers and continuous alumina fibers. The alumina fibers employed in the present invention, whether they be staple fibers or continuous filaments, are formed from crystalline alumina. For producing crystalline alumina fibers, it is preferred that a starting material containing for example 60 to 100 wt. %, preferably 70 to 95 wt% of an $Al_2O_3$ content and the balance of inorganic contents other than $Al_2O_3$, such as $SiO_2$, MgO, $ZrO_2$, $Cr_2O_3$ or $B_2O_3$ is processed as later described and ultimately sintered at a temperature of 1000° to 1400° C. and preferably 1200° to 1350° C. The sintering temperature lower than 1000° C. is not desirable because only insufficient fiber strength may then be obtained while the fibers may undergo severe thermal contraction when reheated, that is, subjected to higher temperatures at the side of application, such as on the furnace walls. Similarly, the sintering temperature in excess of 1400° C. is not desirable from economic considerations because the fiber properties are not improved while fiber strength is rather lowered. The components of the alumina fibers may include for example $Al_2O_3$, $Al_2O_3$-$SiO_2$, $Al_2O_3$-$MgO$, $Al_2O_3$-$MgO$-$SiO_2$, $Al_2O_3$-$ZrO_2$, $Al_2O_3$-$ZrO_2$-$SiO_2$, $Al_2O_3$-$Cr_2O_3$-$SiO_2$ and $Al_2O_3$-$B_2O_3$-$SiO_2$.

The 'staple fibers' employed in the present invention may be obtained for example by a process shown in the U.S. Pat. No. 4348341 wherein a starting thick solution for preparation of alumina fibers is continuously supplied to a supply pipe projecting and opening at the center of a funnel-shaped disc and blown onto the disc surface from the supply pipe while the disc is rotated, so that the starting solution is centrifugally dispersed and sent flying from the edge of the rotating funnel-shaped disc, the solution thus sent flying in the form of droplets being blown out and dried by a hot air current and then processed suitably as required. The term 'staple fibers' herein means fibers of unspecified lengths prepared by the process shown, for example in the aforementioned U.S. Pat. No. 4,348,341. It is to be noted that the fibers of unspecified lengths prepared by any other methods may also be employed in the present invention. The term 'continuous filaments' employed in the present invention may be obtained for example by the process disclosed in the U.S. Pat. No. 3,992,498 wherein a starting thick solution for preparation of alumina fibers is continuously extruded through a spinneret or nozzle. Theoretically, the term 'continuous filaments' means fibers or filaments of infinite lengths.

The alumina fibers employed in the present invention, whether they be staple fibers or continuous filaments, may be prepared by first producing a precursor of alumina fibers and sintering the produced precursor of alumina fibers. It is preferred that for producing the precursor of alumina fibers, an aqueous solution of aluminum oxychloride containing for example water-soluble matal salts, such as magnesium or zirconium salts, and colloidal silica, be admixed with an aqueous solution of a water-soluble organic polymer, such as polyvinyl alcohol or polyethylene oxide, and the resulting mixture be concentrated under a reduced pressure as required to adjust the viscosity to produce the starting thick solution. Then, for producing staple fibers, the starting thick solution having a viscosity of 5 to 20 poises is blown onto the surface of a rotating funnel-shaped disc, so that the solution is blown out and dried by a hot air current to produce a precursor of alumina staple fibers, as shown for example in the aforementioned U.S. Pat. No. 4,348,341. When producing the continuous filaments, the starting thick solution having a viscosity of 1000 to 4000 poises is continuously extruded and dried to produce a precursor of continuous alumina filaments.

According to the present invention, the heat-resistant alumina fiber mat may be produced by sintering the precursor of staple alumina fibers at a temperature preferably in the range from 1000° to 1400° C. to produce staple alumina fibers, collecting these staple fibers together to form an accumulated mass in the form of a mat and sewing the accumulated mass with continuous alumina filaments obtained by sintering the precursor of continuous alumina filaments at a temperature preferably in the range from 1000° to 1400° C. However, in order to provide for more facilitated adjustment of the thickness of the accumulated mass to a uniform thickness and to prevent possible destruction of the staple fibers during sewing, it is more preferred that the precursor of alumina staple fibers be collected to form an accumulated mass, which is then sewn with the sintered continuous alumina filaments or a precursor of continuous alumina filaments to produce a sewn mass, which is then sintered to produce the heat-resistant alumina fiber mat of the present invention. It is preferred that the sewn mass be sintered at a temperature in the range of 1000° to 1400° C. and more preferably in the range of 1200° to 1350° C. In any of the above methods for producing the heat-resistant alumina fiber mat, it is preferred that the continuous alumina filaments be used in an amount not higher than 20 wt. % and more preferably in the range from 5 to 15 wt. % based on the total weight of the heat-resistant alumina fiber mat. It is not desirable from considerations of manufacture costs to use the continuous alumina filaments in excess of 20 wt. % in view that the peeling strength is not correspondingly increased and the expensive continuous alumina fibers are used to no purpose. Although the alumina staple fibers and the continuous alumina filaments may be of the same or different compositions, it is more preferred to use the same composition for the staple alumina fibers and the continuous alumina filaments, especially when the corresponding precursors are used, in consideration that the staple fibers and the continuous filaments adhere to and react with each other during sewing and sintering to increase the strength of the heat-resistant alumina fiber mat, and that there is no difference in properties such as heat expansion coefficients on reheating between the staple fibers and the continuous filaments so that deterioration of the mat is minimized while deterioration by the chemical reaction with other components is inhibited.

According to the present invention, the accumulated mass of the staple alumina fibers is sewn with the continuous alumina filaments, as described hereinabove. Examples of the sewing operation are hereafter explained by referring to the accompanying drawings. However, the present invention is not limited to the presently explained examples. Since the examples may be applied to the cases of sewing the accumulated mass of alumina staple fibers with continuous alumina filaments or sewing the accumulated mass of the precursor of alumina staple fibers with the continuous alumina filaments or the precursor of the continuous alumina filaments, the terms such as 'the accumulated mass of staple fibers' and 'the continuous filaments', will be used simply in the following description.

FIG. 1 shows an example a heat-resistant alumina fiber mat 10 according to the present invention. In this example, continuous filaments are used as an upper yarn 11 and are only tafted. In FIG. 1, the mat is shown in a perspective view with parts thereof being removed to illustrate the state of sewing by the upper yarn 11 of the continuous filaments. An accumulated mass 12 of the staple fibers can be sewn only with the upper yarn 11. FIG. 2 shows the accumulated mass 12 of staple fibers being sewn with a needle 13. The upper yarn 11 of the continuous filaments is threaded through an eye of the needle 13. As the needle 13 pierces through the accumulated mass 12, a looper 14 engages with an end part 11a of the upper yarn 11 to prevent the upper yarn 11 from being extracted with the needle 13 to no purpose during the upward needle stroke. When the needle 13 is extracted upward from the accumulated mass 12, the mass 12 is fed along the direction of the arrow mark A. The sequence of sewing operations is then continued in the similar manner.

FIG. 3 shows another example of the heat-resistant alumina fiber mat 30 according to the present invention. The fiber mat 30 of FIG. 3 is basically the same as that shown in FIG. 1, but a lower yarn 15 of continuous alumina filaments is employed in the example of FIG. 3. As shown in FIG. 4, the lower yarn 15 is fed from a looper 16 so as to be entangled with the end part 11a of the upper yarn 11. In FIG. 5, it is shown that a mat similar to that shown in FIG. 3 may be obtained only with the upper yarn 11 by single stretching. With the use of a special looper 17, the accumulated mass 12 may be sewn only with the upper yarn 11 without using the lower yarn 15 so that the upper yarn 11 covers not only the upper surface of the mat but also the lower surface. The looper 17 is known per se and is not specified here.

As a sewing machine, a quilting machine may be employed, into which the accumulated mass 12 may be continuously fed by rolls, not shown, so as to be sewn in various ways by sewing needles similarly to conventional materials. The term 'sewing' herein means both tafting shown in FIGS. 1 and 2 and sewing upper and lower surfaces of mats shown in FIGS. 3 to 5. The sewing density is at least one stitched point per 3 cm$^2$ of the mats 10, 30 and preferably two to four stitched points (points a in FIGS. 1 and 3) per cm$^2$ of the mats 10, 30. With less than one stitched point per 3 cm$^2$, the peeling strength, that is, the strength as measured along the direction shown by the arrow mark x in FIG. 1, may be occasionally insufficient.

Whether the continuous alumina filaments or the precursor of the continuous alumina filaments are employed, the continuous filaments may be reinforced for sewing. As a method for reinforcement, high strength continuous filament yarns or fibers and the continuous filaments of the present invention may be entwined together so as to be used for sewing. The high strength continuous filament yarns or fibers may include glass filaments, carbon filaments or organic filaments, such as polyvinyl alchohol-, polyvinyl chloride-, polyester-, polyacrylonitrile- or nylon filaments. The organic filaments are most preferred since they are burnt off by sintering. As another method for reinforcement, the continuous filaments of the present invention may be immersed in organic or inorganic binders, such as silica sol, alumina sol, polyvinyl alchohol or methylcellulose, and dried in situ.

The peeling strength of the heat-resistant alumina fiber mat of the present invention is drastically increased and reaches the value several tens to several hundreds times that of the comparable fiber mat obtained for example by needle punching machines, i.e. 20 g/cm$^2$ to 200 g/cm$^2$. There are also scarcely presented problems of fiber breakage as encountered by needle punching.

Accordingly, the heat-resistant alumina fiber mat of the present invention may have sufficient tensile strength so that the fibers may be used as the fire-resistant and heat-insulating material. Further, by using continuous filaments which will give metal oxides of the same type as those of the mat on sintering, the heat-resistant alumina fiber mat in which the fiber properties are fully exhibited may be produced without the risk of deterioration otherwise caused by the presence of impurities when the mat is used under a high temperature environmemt.

EXAMPLES OF THE INVENTION

The present invention will be further explained with reference to several Examples and Comparative Examples. In the following Examples, the indication of percents (%) is by weight percent.

EXAMPLE 1

To an aqueous solution of aluminum oxychloride was added colloidal silica (SNOWTEX, produced by Nissan Chemical, Ltd.) at a relative ratio which will give a composition after sintering of 80% of $Al_2O_3$ and 20% of $SiO_2$. To this mixed solution was added a 10% aqueous solution of polyvinyl alcohol (10% aqueous solution of 'DENKA POVAL' produced by DENKI KAGAKU KOGYO KK) at a relative ratio which will give the relative amount of polyvinyl alcohol of 12% based on the total amount of alumina and silica, and the resulting mixture was concentrated to give an aqueous solution having the viscosity of 15 poises. This aqueous solution was used as the spinning solution and passed through a rotatable disk having a central aperture to produce an accumulated mass of a precursor of staple alumina fibers having a thickness of 50 mm.

On the other hand, 960 precursor continuous filaments, each about 15 microns in diameter, were collected together and entwined to a single yarn so as to be used as the precursor of the continuous alumina filaments. It is noted that the precursor continuous filaments were prepared from the same starting material as that of the accumulated mass of the precursor staple fibers and obtained by dry extrusion spinning with the relative ratio of polyvinyl alcohol of 15% and with the viscosity of the spinning solution of 1500 poises.

In sewing the precursor continuous filaments to the accumulated mass of the precursor staple fibers, the accumulated mass was compressed to a thickness of 20 mm and the precursor continuous filaments were tafted as the upper yarn to the accumulated mass. The tafting pitch was set so that the sewing density is equal to one stitched point per square centimeters (cm$^2$) after sintering.

The sintering was performed in a tunnel furnace so that the sewn body was maintained at a temperature from room temperature to 800° C. for 30 minutes, at a temperature from 800° to 1300° C. for 15 minutes and at a temperature of 1300° C. for 10 minutes, to produce the heat-resistant alumina fiber mat of the present invention.

EXAMPLE 2

The accumulated mass of precursor staple fibers and precursor continuous filaments same as those employed in the Example 1 were used, but the sewing density was changed from that of Example 1, to produce the heat-resistant alumina fiber mat.

EXAMPLE 3

A heat-resistant alumina fiber mat was produced in the same way as in Example 1 except that the accumulated mass of the precursor staple fibers having a mat thickness of 30 mm was used.

COMPARATIVE EXAMPLE 1

The accumulated mass of the precursor staple fibers obtained in the Example 1 was directly used to produce an alumina fiber mat.

COMPARATIVE EXAMPLE 2

The accumulated mass of the precursor staple fibers obtained in the Example 1 was needle punched with a punching density of seven punched points per square centimeters and sintered to produce an alumina fiber mat.

The measured results of the bulk density and peeling strength of the thus obtained mats are shown in Table 1. In measuring the peeling strength, flat plates were bonded to the upper and lower surfaces of a test sample of 50×50×(thickness) mm and a vertical separating force was applied to the plates, by way of performing a vertical tensile test.

TABLE 1

| | Sewing (stitched points/cm$^2$) | Bulk Density (g/cm$^3$) | Peeling Strength (g/cm$^2$) |
|---|---|---|---|
| Ex. 1 | 1 | 0.14 | 40 |
| Ex. 2 | 2 | 0.15 | 170 |
| | 4 | 0.16 | 200 |
| Ex. 3 | 1 | 0.10 | 40 |
| Com. Ex. 1 | Non | 0.08 | Impossible to determine |
| Com. Ex. 2 | Needle Punching | 0.10 | 0.8 |

EXAMPLE 4

In accordance with Example 1, a mat composed of 70% of Al$_2$O$_3$, 28 % of SiO$_2$ and 2 % of CrO$_2$O$_3$ or B$_2$O$_3$ was produced and tested. The results are shown in Table 2.

EXAMPLE 5

An alumina fiber mat was produced in the same way as in Example 1 except that the precursor of continuous filaments employed in Example 1 was sewn after having been previously sintered at 1200° C.

EXAMPLE 6

An alumina fiber mat was produced in the same way as in Example 5 except that a mat obtained by sintering the accumulated mass of a precursor of staple fibers employed in Example 1 was sewn with the continuous filaments at a sewing density of four stitched points per square centimeters.

EXAMPLE 7

A mat was produced in the same way as in Example 1 except that the precursor continuous filaments employed in Example 1 were entwined with 160 silica glass filaments as reinforcements so as to be used as the precursor of the continuous alumina filaments.

EXAMPLE 8

A mat was produced in the same way as in Example 7 except that polyvinyl alcohol fibers entwined with 160 filaments as reinforcement fibers were used.

EXAMPLE 9

A mat was produced in the same way as in Example 6 except that the reinforced fibers of Example 8 were employed. The results of the tests similar to those in Examples 1 to 3 are shown collectively in Table 2.

TABLE 2

| Example | Sewing (stitched points/cm$^2$) | Bulk Density (g/cm$^3$) | Peeling Strength (g/cm$^2$) |
|---|---|---|---|
| 4 Cr$_2$O$_3$ contained | 1 | 0.12 | 30 |
| B$_2$O$_3$ contained | 1 | 0.12 | 40 |
| 5 | 1 | 0.11 | 20 |
| 6 | 4 | 0.10 | 20 |
| 7 | 1 | 0.12 | 50 |
| 8 | 1 | 0.15 | 90 |
| 9 | 4 | 0.10 | 70 |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A process for producing a heat-resistant alumina fiber mat comprising accumulating a precursor of alumina staple fibers to obtain an accumulated mass, sewing said accumulated mass with a precursor of continuous alumina filaments to form a sewn mass and then sintering the sewn mass to convert said precursor of alumina staple fibers and said precursor of continuous alumina filaments into alumina staple fibers and continuous alumina filaments.

2. A process according to claim 1 comprising sintering said sewn mass at 1000° to 1400° C.

3. A process according to claim 1 wherein said precursor of alumina staple fibers is obtained by centrifugally dispersing a starting solution containing an aqueous solution of aluminum oxychloride and an aqueous solution of a water-soluble organic polymer and drying the dispersed solution by a hot air current.

4. A process according to claim 1 wherein said precursor of continuous alumina filaments is obtained by extruding a starting solution containing an aqueous solution of aluminum oxychloride and an aqueous solution of a water-soluble organic polymer.

5. A process according to claim 1 wherein said precursor of continuous alumina filaments are reinforced by being entwined with high strength fibers.

6. A process according to claim 5 wherein said high strength fibers are selected from the group consisting of glass fibers, carbon fibers and organic fibers.

7. A process according to claim 1 wherein said precursor of continuous alumina filaments are reinforced by being immersed in a binder and dried.

8. A process according to claim 1 comprising sewing said accumulated mass with an upper yarn of said precursor of continuous alumina.

9. A process according to claim 1 comprising sewing said accumulated mass with an upper yarn and a lower yarn of said precursor of continuous alumina filaments.

* * * * *